United States Patent
Kozyrski et al.

[11] Patent Number: 5,704,751
[45] Date of Patent: Jan. 6, 1998

[54] V-NAIL FASTENER

[75] Inventors: Vincent T. Kozyrski, Plainville, Conn.; Alan R. Peters, Bokeelia, Fla.

[73] Assignee: The Fletcher-Terry Company, Farmington, Conn.

[21] Appl. No.: 794,207

[22] Filed: Jan. 30, 1997

[51] Int. Cl.$^6$ .................................................. F16B 15/00
[52] U.S. Cl. ............................ 411/478; 411/496; 411/922
[58] Field of Search ...................................... 411/477, 478, 411/488, 496, 922

[56] References Cited

U.S. PATENT DOCUMENTS

| | | |
|---|---|---|
| 1,664,687 | 4/1928 | Jensen . |
| 1,677,092 | 7/1928 | Jensen . |
| 1,793,185 | 2/1931 | McChesney . |
| 1,959,360 | 5/1934 | Heyser . |
| 2,151,716 | 3/1939 | Putnam . |
| 3,266,361 | 8/1966 | Gravenhorst et al. . |
| 3,431,810 | 3/1969 | Black . |
| 4,681,498 | 7/1987 | Raffoni . |
| 4,718,804 | 1/1988 | Cassese . |
| 5,193,959 | 3/1993 | Motta . |
| 5,336,038 | 8/1994 | Raffoni . |

FOREIGN PATENT DOCUMENTS

| | | | |
|---|---|---|---|
| 58280 | 8/1982 | European Pat. Off. | ............ 411/477 |
| 0093626 | 11/1983 | European Pat. Off. . | |
| 2629151 | 9/1989 | France | ............ 411/477 |

*Primary Examiner*—Neill R. Wilson
*Attorney, Agent, or Firm*—Ira S. Dorman

[57] ABSTRACT

A V-nail fastener has a leading edge that is partially formed with asymmetric sharpening, limited substantially to the central sections. Flange elements extend generally perpendicularly to the panel elements of which the central (V-shaped) portion is constructed and cooperate therewith to give the fastener a W-shaped overall profile. The lateral sections of the leading edge, which extend along the flange elements, are substantially devoid of sharpening, or are otherwise so formed as to permit the directional influence of the asymmetric sharpening to occur substantially undiminished.

8 Claims, 2 Drawing Sheets

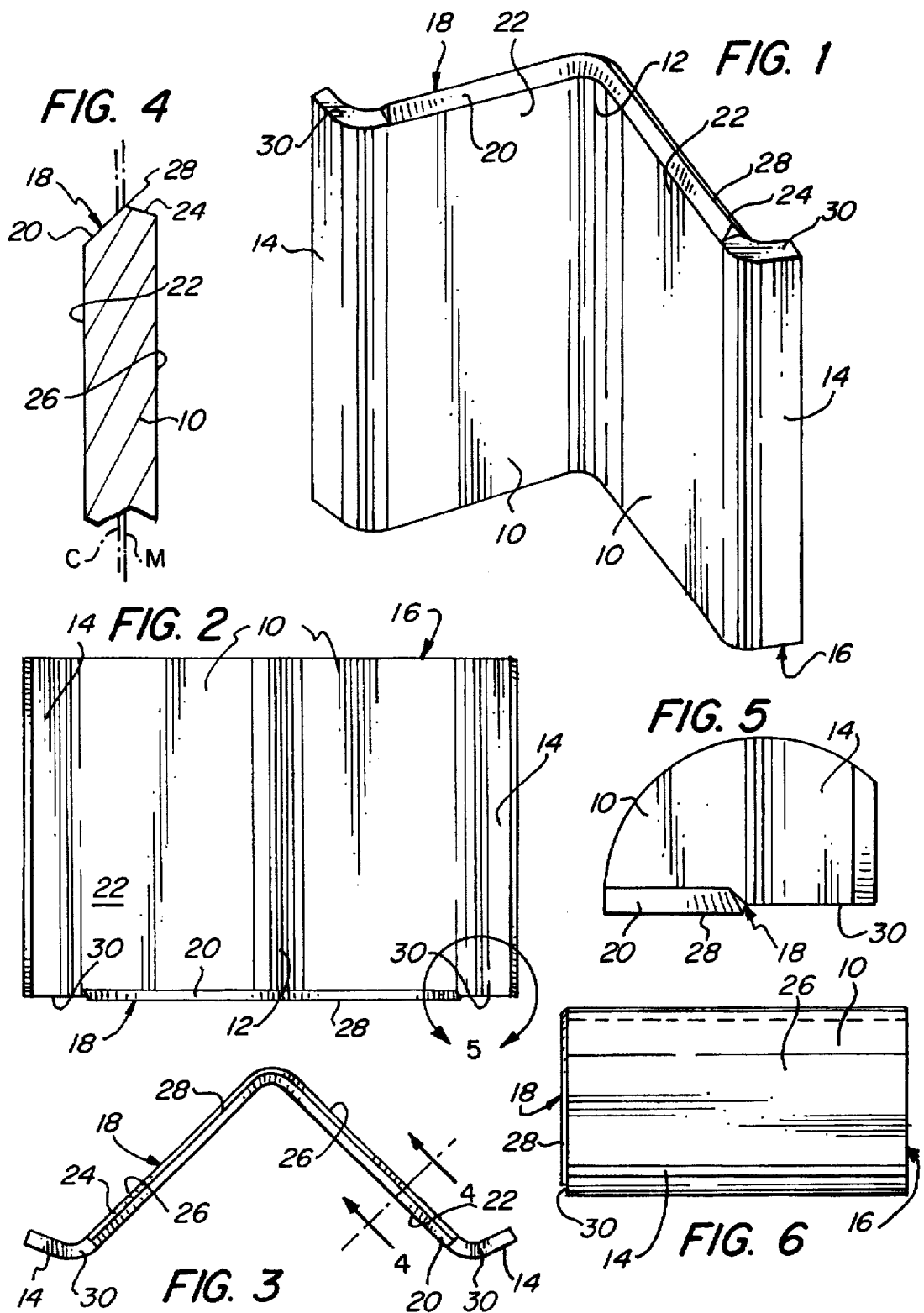

5,704,751

1

V-NAIL FASTENER

BACKGROUND OF THE INVENTION

Sheet metal fasteners, commonly referred to as V-nails, are widely used for securing wooden frame members to form miter joints. Such fasteners are disclosed in the following representative U.S. Pat. Nos.: Raffoni U.S. Pat. Nos. 4,681,498 and 5,336,038, Cassese U.S. Pat. No. 4,718,814, and Motta U.S. Pat. No. 5,193,959. It is also known to form the leading, sharpened edge of such nails with an asymmetric profile; see for example FIG. 1 of U.S. Pat. No. 4,681,498 and FIG. 1a of U.S. Pat. No. 5,336,038. Such asymmetry tends to cause the nail to deviate from a straight path as it is being driven into the wood, which deviation can serve to generate closing forces for drawing the frame pieces together and to thereby produce a tight, gap-free joint.

Numerous other forms of nails, designed for joining adjacent pieces, are disclosed in the art. In some instances they have sharpened central leading edge sections, and laterally disposed sections that are unsharpened and/or indented; see for example the following U.S. Pat. Nos.: Jensen U.S. Pat. Nos. 1,664,687 and 1,677,092, McChesney U.S. Pat. No. 1,793,185, Heyser U.S. Pat. No. 1,959,360, Putnam U.S. Pat. No. 2,151,716, Gravenhorst et al U.S. Pat. No. 3,266,361, and Black U.S. Pat. No. 3,431,810.

SUMMARY OF THE INVENTION

Despite the activity the art illustrated by the foregoing citations, the need remains for a V-nail fastener that is capable of generating enhanced closing forces upon frame pieces into which it is driven at a miter joint; it is therefore the broad object of the present invention to provide such a fastener. A related object of the invention is to provide a novel V-nail fastener having the foregoing features and advantages which is, in addition, relatively facile and inexpensive to manufacture.

It has now been found that the foregoing and related objects of the invention are readily attained by the provision of a sheet metal fastener that comprises a pair of generally planar, rectangular panel elements, that intersect to form a corner, and a pair of flange elements along opposite margins of the panel elements. The flange elements are spaced laterally from the corner of the fastener; they extend generally parallel to it and in a generally outward direction, thereby cooperating with the V-shaped central portion to impart to the fastener a substantially W-shaped profile. The central sections of the leading edge of the fastener, which extend along the panel elements, are formed with an asymmetric sharpening taper, which causes the fastener to generate closing forces that urge the frame pieces toward one another, when it is driven into them at a miter joint. The lateral sections of the leading edge, which extend along the flange elements, are at least substantially devoid of the same form of sharpening taper that is present on the central sections, so as to avoid counteraction of the closing forces that are generated by the central sections.

To provide the necessary asymmetry, the leading edge portion of the fastener may taper to apices that lie closer to the outwardly directed surfaces of the respective panel elements than to the confronting, inwardly directed surfaces thereof. Alternatively (or preferably, in addition thereto), the leading edge portion may be formed by surface elements that are disposed at different angles, taken with respect to medial planes of the respective panel elements, the angle of the edge surface elements that lie adjacent the outwardly directed surfaces of the panel elements being greater than the angle of the edge surface elements that lie adjacent the confronting surfaces thereof.

Generally, the lateral sections of the leading edge will be formed as substantially flat surface elements, disposed on a first common transverse plane which lies substantially perpendicular to the medial planes of the panel elements. The central sections of the leading edge will usually extend slightly beyond that plane, disposing the apices thereof on a second common transverse plane. In most instances, the panel elements comprising the fastener will be mutually disposed at substantially a right angle, with each flange element being disposed at an angle of about 90° to 120°, taken with reference to the outwardly directed surface of the panel element to which it is connected.

BRIEF DESCRIPTION OF THE DRAWINGS

FIG. 1 is a perspective view of a V-nail fastener embodying the present invention;

FIG. 2 is an elevational view of the fastener of FIG. 1, taken from the inner side and showing the fastener with the leading edge downwardly directed;

FIG. 3 is a plan view of the fastener of FIG. 1, showing the leading edge of the nail;

FIG. 4 is a sectional view of the leading end of the V-nail taken, along line 4—4 of FIG. 3 and drawn to a greatly enlarged scale;

FIG. 5 is a fragmentary elevational view of the leading end of the V-nail, taken along section 5 of FIG. 2 and showing the relationship between the apex of the sharpened portion of the leading edge, on the panel element, and the flat surface that constitutes the leading edge of the adjacent flange element;

FIG. 6 is a side view of the nail of the foregoing Figures; and

DETAILED DESCRIPTION OF THE PREFERRED AND ILLUSTRATED EMBODIMENT

Figure 7:
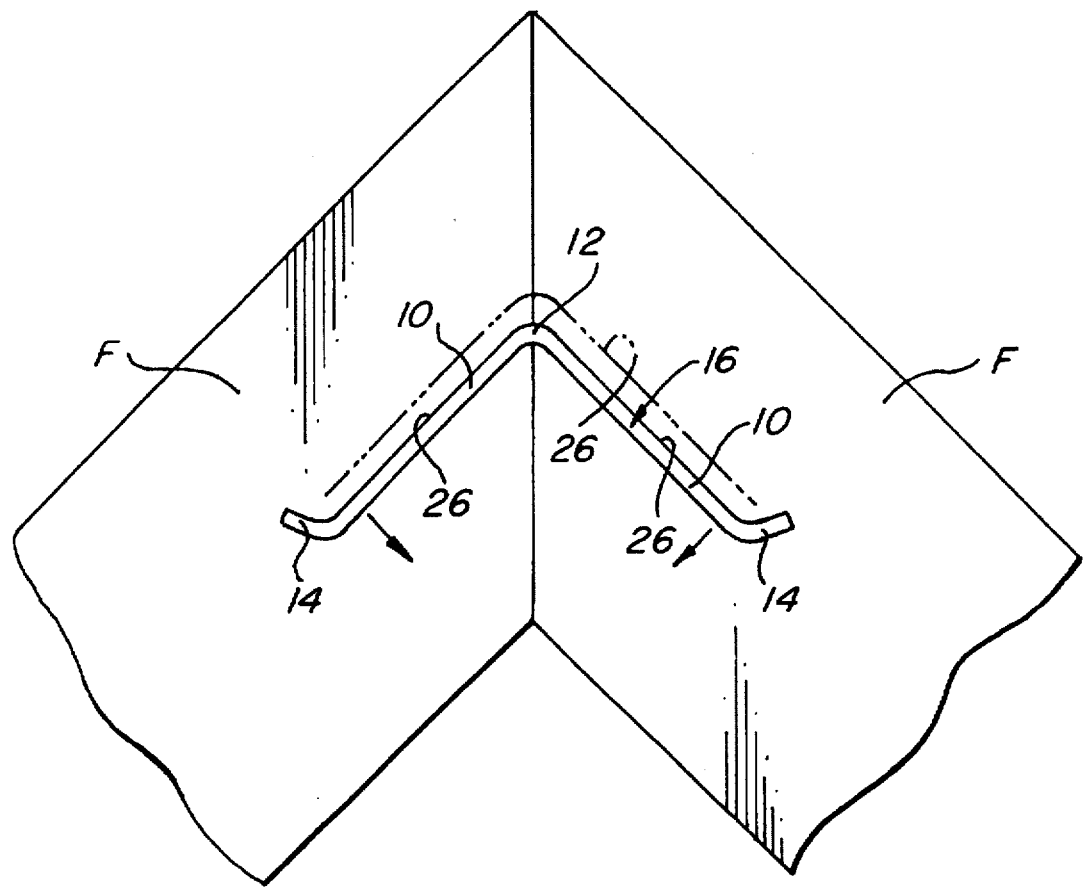
FIG. 7 is a diagrammatic plan view showing a V-nail embodying the invention driven into frame pieces at a miter joint.

Turning now in detail to the appended drawings, therein illustrated is a V-nail fastener embodying the present invention, integrally formed from a single piece of sheet metal. Identifiable on the nail are rectangular panel elements 10, disposed in a right-angular relationship to one another and intersecting at a corner 12, and flange elements 14; the elements 14 are spaced laterally from the corner 12, and they extend from the margins of the panel elements 10 an angle of about 110° relative to the contiguous outer surface 26. The flat trailing edge portion of the nail, generally designated by the numeral 16, is adapted to receive driving force, whereas the leading end is formed with relatively sharp edge sections to facilitate penetration of the nail into the frame pieces that are to be joined.

More particularly, the leading end portion of the nail, generally designated by the numeral 18, is asymmetrically coined to form angled surface elements 20, 24, which intersect at apex 28 and extend substantially entirely along the central, leading edge sections of the nail on the two panel elements 10. It will be noted (especially from FIG. 4) that the surface element 20, which lies contiguous to the inner surface 22 of the panel element, is formed at an angle (typically 45°) that is smaller than that at which the element 24, contiguous to the outer surface 26, is formed (typically 70°), both angles being taken with reference to the medial plane M. It will also be noted that the apex 28, lying in the medial plane M, is offset slightly, in the outward direction of the nail, from the central plane C of the panel element.

As will be appreciated by those skilled in the art, the resultant asymmetry of the sharpened edge portion will influence the path followed by the nail upon being driven into the frame pieces, causing it to deviate from a true path, in the outward direction (i.e., with the leading edge moving toward the phantom line position of FIG. 7). This will in turn cause the panel elements 10 of the nail to exert a closing force upon the frame pieces F (as indicated by the arrows in FIG. 6), thereby urging the frame pieces toward one another and increasing the tightness of the resultant joint.

It will also be appreciated however that the presence of similar, asymmetric edge structure on the flange elements 14 will cause the flange elements to exert a counteracting influence upon the driven nail, due to their angular relationship to the panel elements 10. Such construction (to which the relevent prior art is limited) consequently compromises the closing effect produced by the nail, and thereby reduces its ability to draw the frame pieces together, into a tight joint.

As can be seen from the appended drawings, in the instant nail the sections of the leading edge that extend along the flange elements 14 are devoid of sharpening, and instead constitute flat surfaces 30 (which do however form sharp edges at the intersections with the inner, outer, and lateral faces of the flange elements). Because of this construction, the leading ends of the flange elements 14 exert little or no influence upon the direction followed by the driven nail, allowing the asymmetrically coined central sections to control its path and thereby to exert maximum tightening power.

It will be noted from FIG. 5 that the flat surfaces 30 on the flange elements 14 lie in a common plane, beyond which the apices 28, formed by the surface elements 20, 24, extend slightly (i.e., typically 2.0 mils or less). This projection results simply from the coining operations, and is believed to have no significant affect upon the functioning of the nail.

It may also occur to those skilled in the art that, rather than forming the leading edges of the flange elements 14 with flat faces, a coining or other sharpening effect may be employed to produce an asymmetric structure thereon which cooperates constructively with that of the central sections of the leading edge, and that thereby increases the net closing force. Albeit within the broad concept of the invention, the introduction of such features would be expected to add undue complexity and expense to the manufacturing operations. Other modifications that may be made include the provision of sharpened leading edges on the flange elements, and of blunted tips on the leading edges of the panel elements (to facilitate stacked driving).

By way of further description, and not limitation, it might be mentioned that V-nails embodying the present invention will typically be formed from low-carbon strip steel having a thickness of about 12 mils. The nails may have an overall, side-to-side dimension of about 400 mils, with the central, V-shaped portion measuring about 330 mils; the overall, front-to-back dimension will typically be about 160 mils, and the length of the nail will typically range from about 280 to 590 mils.

Thus, it can be seen that the present invention provides a novel V-nail fastener for joining frame pieces at a miter joint, which fastener is capable of generating enhanced closing forces, as compared to V-nails of the prior art, and is of relatively facile and inexpensive manufacture.

Having thus described the invention, what is claimed is:

1. A fastener for joining frame pieces at a miter joint by driving the fastener thereinto, said fastener being fabricated from a piece of sheet metal and comprising a pair of generally planar, rectangular panel elements that intersect to form a corner and that provide a central portion having a V-shaped profile, and a pair of flange elements along opposite margins of said panels, spaced laterally from said corner and extending generally parallel thereto, the generally confronting surfaces of said panel elements facing in an inward direction and the opposite surfaces thereof facing in an outward direction, said flange elements extending from said opposite margins of said panel elements in a generally outward direction to cooperatively impart to said fastener a generally W-shaped profile, said fastener having a leading end with a leading edge, extending along said panel elements and said flange elements, that is formed for penetration into the frame pieces being joined, and having a trailing end that is formed for contact to receive driving force; the improvement wherein said leading edge of said fastener is partially formed with a sharpening taper, the portion of said leading edge that is formed with a sharpening taper comprising central sections that extend along said panel elements of said fastener, with lateral sections of said leading edge, which extend along said flange elements, being substantially devoid of any sharpening taper; and wherein said sharpening taper of said leading edge portion is asymmetric, the asymmetry of said leading edge portion causing said fastener to deflect in said outward direction when it is driven into frame pieces that are disposed at a miter joint, and thereby to generate forces that urge the frame pieces toward one another.

2. The fastener of claim 1 wherein each of said central sections of said leading edge portion tapers to an apex in a plane that lies closer to said opposite surface of the respective one of said panel elements along which said central section extends, than to said confronting surface thereof.

3. The fastener of claim 1 wherein each of said central sections of said leading edge portion is formed by edge surface elements that intersect at an apex and that are disposed at different angles relative to a medial plane of the respective one of said panel elements, the angle of said edge surface element adjacent said opposite surface of said respective panel element being greater than the angle of said edge surface element adjacent said confronting surface thereof.

4. The fastener of claim 1 wherein said lateral sections of said leading edge are formed as substantially flat surface elements that are disposed on a first common transverse plane which lies substantially perpendicular to medial planes of said panel elements.

5. The fastener of claim 4 wherein said central sections of said leading edge portion taper to apices that lie on a second common transverse plane, said central sections of said leading edge extending slightly beyond said flat surface elements of said lateral sections thereof.

6. The fastener of claim 1 wherein said panel elements are disposed at substantially a right angle to one another, and wherein each of said flange elements is disposed at an angle of about 90° to 120° relative to said opposite surface of the respective one of said panel elements to which it is connected.

7. The fastener of claim 1 wherein said each of said central sections of said leading edge portion tapers to an apex in a plane that lies closer to said opposite surface of the respective one of said panel elements along which said central section extends, than to said confronting surface thereof, and is formed by edge surface elements that intersect at an apex and that are disposed at different angles relative to a medial plane of said respective panel element, the angle of said edge surface element adjacent said opposite surface of said respective panel element being greater than the angle of said edge surface element adjacent said confronting surface thereof; and wherein said lateral sections of said leading edge are formed as substantially flat surface elements that are disposed on a first common transverse plane which lies substantially perpendicular to said medial planes of said panel elements, said apices of said central sections of said leading edge portion lying on a second common transverse plane, and said central sections extending slightly beyond said flat surface elements of said lateral sections thereof.

8. A fastener for joining frame pieces at a miter joint by driving the fastener thereinto, said fastener being fabricated from a piece of sheet metal and comprising a pair of generally planar, rectangular panel elements that intersect to form a corner and that provide a central portion having a V-shaped profile, and a pair of flange elements along opposite margins of said panels, spaced laterally from said corner and extending generally parallel thereto, the generally confronting surfaces of said panel elements facing in an inward direction and the opposite surfaces thereof facing in an outward direction, said flange elements extending from said opposite margins of said panel elements in a generally outward direction to cooperatively impart to said fastener a generally W-shaped profile, said fastener having a leading end with a leading edge, extending along said panel elements and said flange elements, that is formed for penetration into the frame pieces being joined, and having a trailing end that is formed for contact to receive driving force; the improvement wherein said leading edge of said fastener is partially formed with an asymmetric sharpening taper, the portion of said leading edge that is formed with said sharpening taper comprising central sections that extend along said panel elements of said fastener, the asymmetry of said leading edge portion causing said fastener to deflect in said outward direction when said fastener is driven into frame pieces that are disposed at a miter joint, and thereby to generate forces that urge the frame pieces toward one another, lateral sections of said leading edge, which extend along said flange elements, being substantially devoid of said sharpening taper and exerting substantially no influence, counter to that which is exerted by said leading edge portion, upon the direction followed by said driven fastener.

\* \* \* \* \*